United States Patent

Kawamoto et al.

[11] Patent Number: 5,717,530
[45] Date of Patent: Feb. 10, 1998

[54] ZOOM LENS DEVICE HAVING ADJUSTABILITY FEATURES

[75] Inventors: Kenichi Kawamoto, Komae; Toshiyuki Udo, Kawasaki, both of Japan

[73] Assignee: Canon Kabushiki Kaisha, Tokyo, Japan

[21] Appl. No.: 700,041

[22] Filed: Aug. 20, 1996

Related U.S. Application Data

[63] Continuation of Ser. No. 377,789, Jan. 24, 1995, abandoned.

[30] Foreign Application Priority Data

Jan. 28, 1994 [JP] Japan .................... 6-026385

[51] Int. Cl.$^6$ .................... G02B 7/02; G02B 15/14
[52] U.S. Cl. .................... 359/822; 359/694; 359/813
[58] Field of Search .................... 359/694, 704, 359/822, 823, 813, 814, 819

[56] References Cited

U.S. PATENT DOCUMENTS

| | | | |
|---|---|---|---|
| Re. 27,222 | 11/1971 | Weaver | 359/823 |
| 2,293,592 | 8/1942 | Cisski | 359/823 |
| 3,851,952 | 12/1974 | Werz | 359/706 |
| 4,099,866 | 7/1978 | Jones et al. | 355/58 |
| 4,149,774 | 4/1979 | Hirano et al. | 350/184 |
| 4,521,100 | 6/1985 | Yonemori et al. | 355/8 |
| 4,767,200 | 8/1988 | Inaba et al. | 359/699 |
| 4,865,433 | 9/1989 | Okajima | 359/694 |
| 5,130,851 | 7/1992 | Shirie | 359/700 |
| 5,231,473 | 7/1993 | Kawamura | 359/704 |
| 5,363,248 | 11/1994 | Horio | 359/704 |

FOREIGN PATENT DOCUMENTS

| | | | |
|---|---|---|---|
| 60-207128 | 10/1985 | Japan | |
| 60-260935 | 12/1985 | Japan | |
| 4350608 | 5/1991 | Japan | 359/694 |

*Primary Examiner*—David C. Nelms
*Assistant Examiner*—Ricky Mack
*Attorney, Agent, or Firm*—Fitzpatrick, Cella, Harper & Scinto

[57] ABSTRACT

The present invention is directed to a zoom lens device for use in, for example, a copying machine. A support member for supporting a stationary lens is adjustable relative to a guide device for guiding a movable lens in a direction of an optical axis.

12 Claims, 13 Drawing Sheets

DIRECTION IN WHICH LIGHT TRAVELS

ZOOM LENS DEVICE HAVING ADJUSTABILITY FEATURES

This application is a continuation application of application Ser. No. 08/377,789, filed Jan. 24, 1995, now abandoned.

BACKGROUND OF THE INVENTION

1. Field of the Invention

The present invention relates to a zoom lens device which can be utilized in, for example, an optical system of a copying machine which employs electrophotography.

2. Description of the Related Art

FIGS. 10 through 13 illustrate a conventional zoom lens device of the above-described type.

Figure 10:
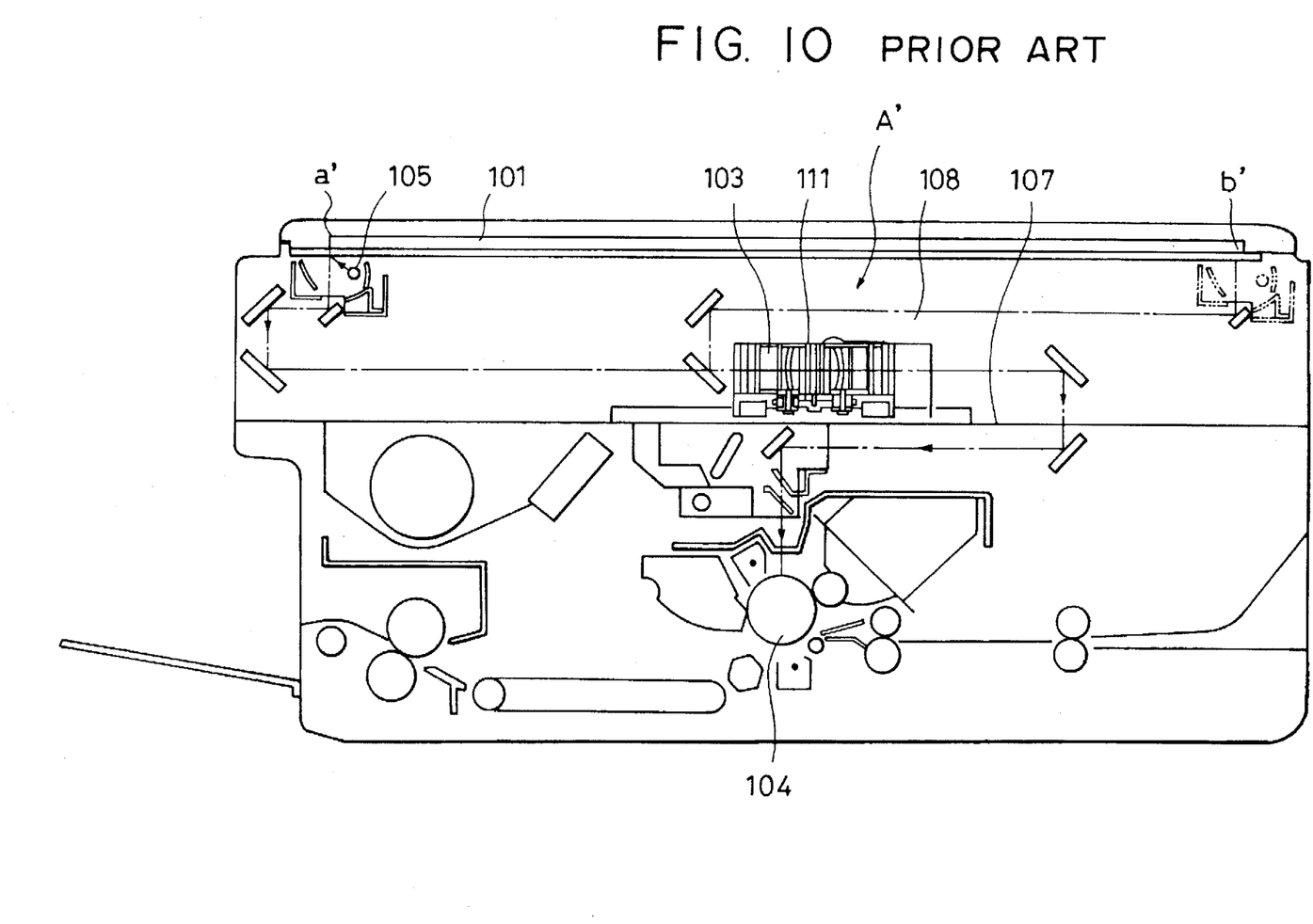
FIG. 10 is a cross-sectional view of a normally employed slit exposure type electrophotographic copying machine to which a conventional zoom lens device is applied.

Referring first to FIG. 10, which is a cross-sectional view of a slit exposure type electrophotographic copying machine having a zoom lens device A', a reflected light from an original 101 illuminated in a slit by a light source 105 reaches a photosensitive drum 104 through a zoom lens unit 103. An image of the original 101 obtained by scanning the original at the same speed from an end portion a' thereof to an end portion b' is formed, as a latent image, on the photosensitive drum 104 charged by a charger beforehand. The latent image on the photosensitive drum 104 is developed by a developer. The developed image is transferred onto a transfer paper. The motion of the optical system and the electrophotographic process are known, so a description thereof is omitted.

Figure 11A:
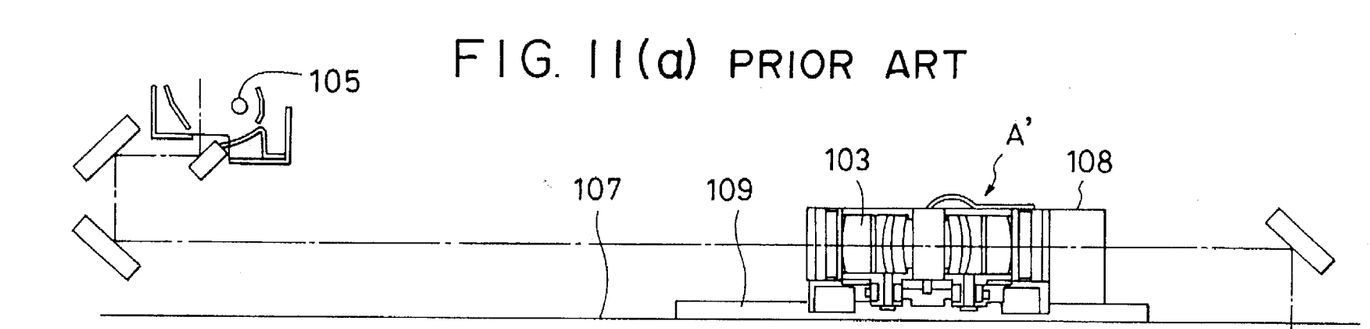
FIGS. 11(a), 11(b) and 11(c) illustrate movement of a conventional zoom lens at a set magnification.
Figure 11B:
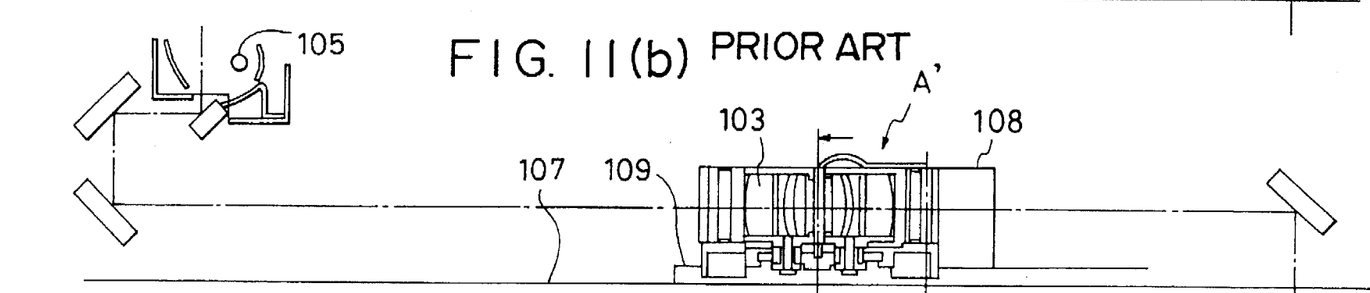
Figure 11C:
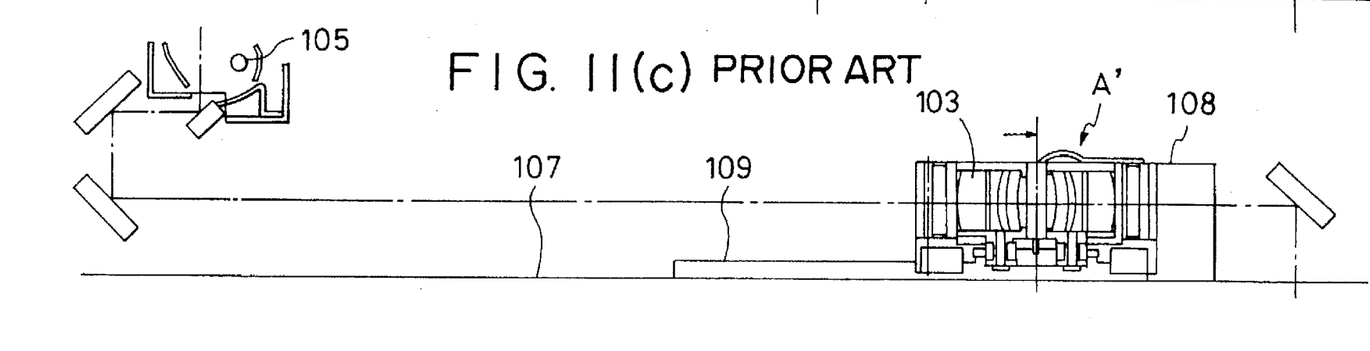

FIGS. 11(a), 11(b) and 11(c) are schematic views of the optical system shown in FIG. 10. In the optical system, the distance between the surface of the original and the surface of the photosensitive drum 104 is fixed regardless of the magnification of the zoom lens system to achieve simplification of the structure of the optical system. When a copy having the same size as that of the image of the original 101 is produced, the zoom lens unit 103 is substantially and optically located at the midpoint between the original and the surface of the photosensitive drum 104, as shown in FIG. 11(a). When a copy having a size larger than that of the original 101 is produced, the zoom lens unit 103 is moved toward the original to obtain a desired focal length and hence magnification, as shown in FIG. 11(b), and the image of the original is formed on the photosensitive drum 104 through that zoom lens unit 103. To obtain a reduced size copy, the zoom lens unit 103 is moved toward the photosensitive drum 104, as shown in FIG. 11(c).

Figure 12:
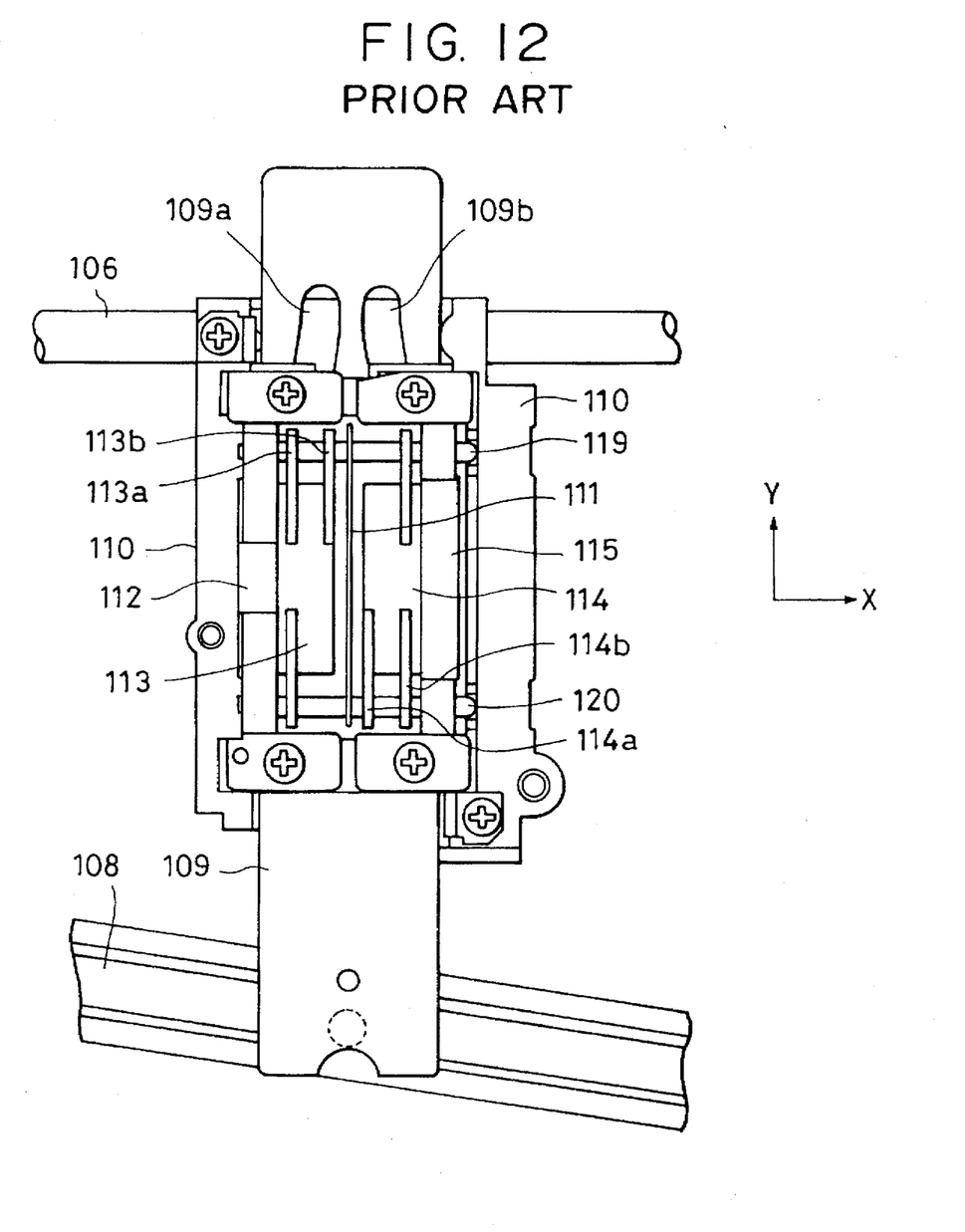
FIG. 12 is a plan view of a conventional zoom lens.
Figure 13:
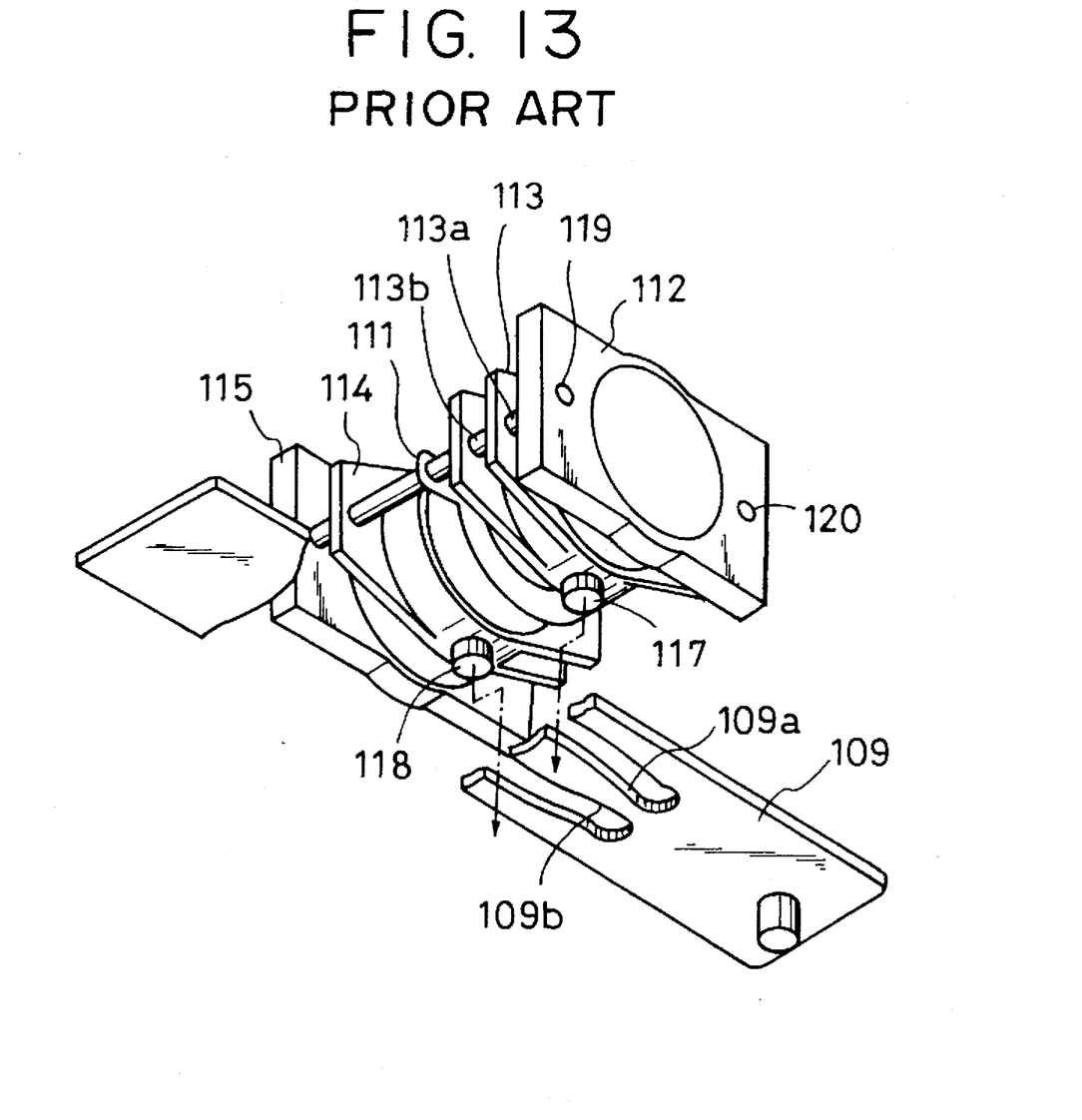
FIG. 13 is a perspective view of the conventional zoom lens as viewed when looking from the rear side thereof.

FIG. 12 illustrates the zoom lens unit in detail. FIG. 13 is a perspective view of major lens barrels of the zoom lens unit. The elements of the zoom lens unit will now be described with reference to FIGS. 12 and 13.

A guide rail 106 for guiding the entire zoom lens unit 103 and a cam groove plate 108 for guiding a cam plate 109 are disposed on a lens base 107 (FIG. 10) of a copying machine. When an enlarged or reduced copy is obtained, the lens unit 103 is guided along the guide rail 106 and moved by a driving source, such as a motor (not shown), by a distance corresponding to a desired magnification.

The cam plate 109 has two cam grooves 109a and 109b at a central portion thereof. Pins 117 and 118, which protrude from the under surfaces of lens barrels 113 and 114, respectively, each support a movable lens and are fitted into the cam grooves 109a and 109b, respectively (see FIG. 13). The lens barrels 113 and 114, which each support a movable lens, and lens barrels 112 and 115, which each support a stationary lens, are arranged along a line parallel to shafts 119 and 120. The lens barrels 112 and 115 are fixed to and positioned relative to a body frame 110. The lens barrels 113 and 114 are positioned relative to the shafts 119 and 120 by attachment portions 113a and 113b, and 114a and 114b, respectively. The lens barrels 113 and 114 can be moved in the direction of an optical axis along the shafts 119 and 120 in response to the movement of the pins 117 and 118 in the cam grooves 109a and 109b. A single stationary lens is fixed to the inside of each of the lens barrels 112 and 115, and three lenses are fixed to the inside of each of the lens barrels 113 and 114. A stop plate 111 is disposed between the lens barrels 113 and 114.

The shafts 119 and 120 are positioned relative to and fixed to the lens barrel 112 at their end portions located close to the lens barrel 112. The shafts 119 and 120 are also positioned relative to and fixed to the body frame 110 at their end portions located close to the lens barrel 115. The lens barrel 115 has two holes having a diameter larger than that of the shafts 119 and 120. The shafts 119 and 120 pass through those holes of the lens barrel 115 and are positioned relative to and fixed to the body frame 110. Thus, the position of the lens barrel 115 relative to the shafts 119 and 120 can be adjusted both in a direction X of the optical axis and a direction Y perpendicular to the optical axis (see FIG. 12). After the position of the lens barrel 115 has been adjusted in X and Y directions, it is screwed to the body frame 110, i.e., it is positioned relative to the body frame 110.

When the zoom lens unit 103 is moved by the driving source along the guide rail 106 toward a position corresponding to a designated magnification, the cam plate 109 is moved in a direction perpendicular to the optical axis along the cam groove plate 108. As the cam grooves 109a and 109b of the cam plate 109 move, the lens barrels 113 and 114 are moved between the lens barrels 112 and 115 in two opposite directions along the optical axis to change the focal length of the lens unit 103. Thus, an enlarged or reduced image can be obtained while the surface of the original and the surface of the photosensitive drum 104 remain conjugate.

When the above-described zoom lens unit is used, since the magnification can be varied while the optical path length between the surface of the original and the surface of the photosensitive drum is maintained constant, the size of the entire optical system can be reduced.

However, among the lens barrels 112, 113, 114 and 115 aligned on the shafts 119 and 120 in the above-described conventional zoom lens device, the lens barrels 112 and 115 are positioned on the body frame 110, while the lens barrels 113 and 114 are positioned on the shafts 119 and 120. That is, the lens groups which must be disposed along the same optical axis are positioned on different members. Consequently, lens positioning accuracy is deteriorated, thus deteriorating the image forming ability.

Further, to improve the positioning accuracy, the positioning accuracy between the body frame 110 and the shafts 119 and 120 must be improved, thus increasing man-hour and production cost.

Further, small-sized electrophotographic copying machines have been developed in recent years, and small-sized zoom lenses have also been developed. However, this reduction in the size of the zoom lens increases the power of an optical lens (the degree at which the lens refracts light). Consequently, the lens retaining or lens positioning accuracy required for each lens barrel is increased, making the reduction in the size of the lens barrel difficult.

In the above-described lens barrel, since there are only two adjustable degrees of freedom (deviation in the direction of the optical axis and the rotation about the vertical axis), there is limitation to improvement in the image forming ability which is achieved by adjusting the lens.

SUMMARY OF THE INVENTION

In view of the aforementioned problems of the prior art, a primary object of the present invention is to provide a zoom lens device which exhibits excellent image forming ability.

A secondary object of the present invention is to provide a zoom lens device which enables a stationary lens to be readily positioned.

To achieve the above objects of the present invention, there is provided a zoom lens device which comprises a movable lens which is movable in a direction of an optical axis, a guide device for guiding the movable lens in the direction of the optical axis, a stationary lens, and a support member for supporting the stationary lens, the support member being positioned relative to the guide device.

Yet another aspect of the present invention provides a zoom lens device which comprises a movable lens holder that is movable in a direction of an optical axis of the zoom lens device, a guide device for guiding the movable lens holder in the direction of the optical axis, and a stationary lens holder coupled to and positioned relative to said guide device.

Other and further objects of the present invention will be apparent from the following description taken in connection with the accompanying drawings.

DETAILED DESCRIPTION OF THE PREFERRED EMBODIMENTS

Embodiments of the present invention will be described with reference to the accompanying drawings.

(First Embodiment)

Figure 1:
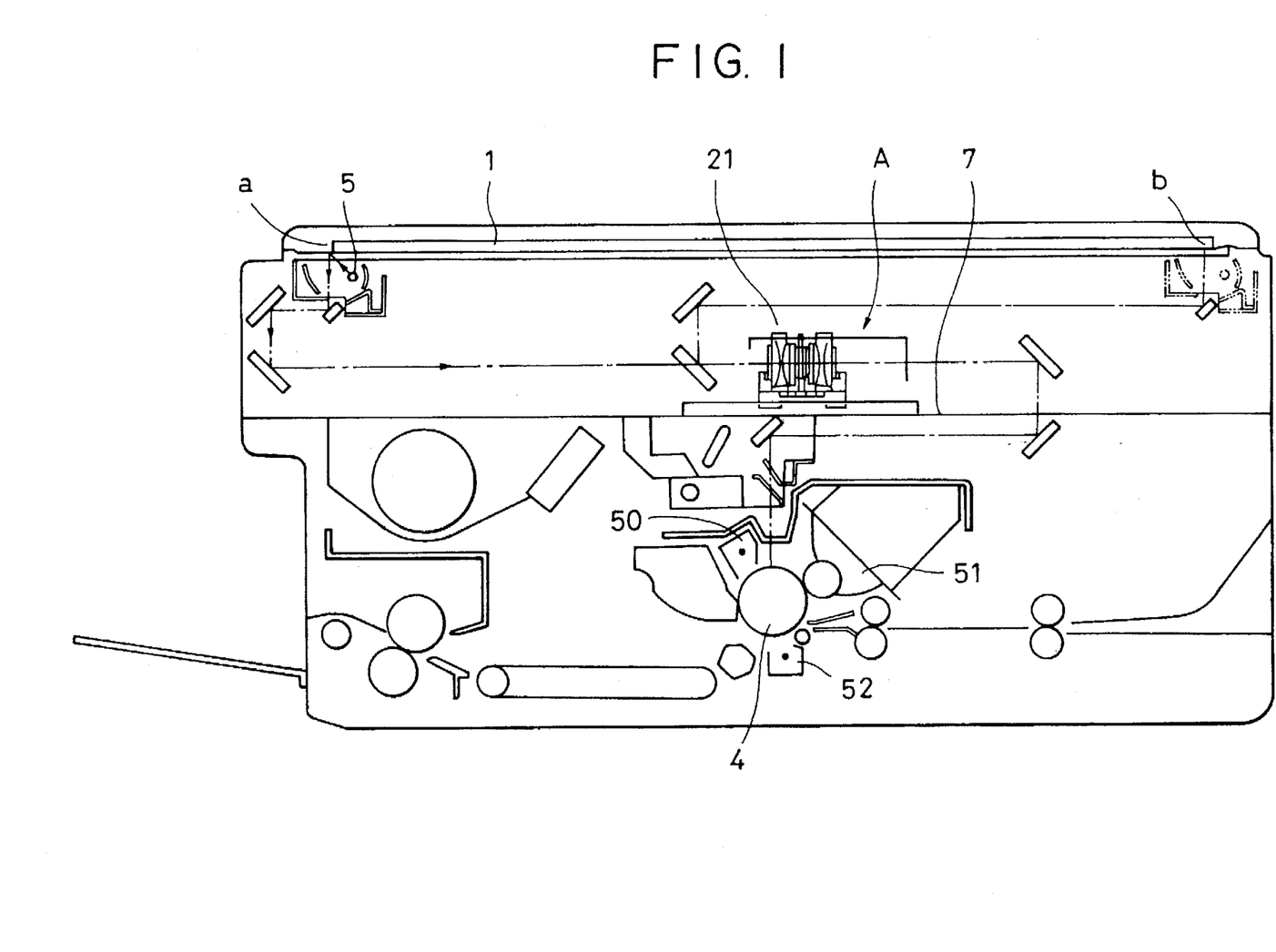
FIG. 1 is a cross-sectional view of a slit exposure type electrophotographic copying machine to which a zoom lens device according to the present invention is applied.

A first embodiment of the present invention will be described with reference to FIGS. 1 through 3. Referring first to FIG. 1 which is a cross-sectional view of a slit exposure type electrophotographic copying machine to which a zoom lens device A according to the present invention is applied, a reflected light from an original 1 illuminated in a slit by a light source 5 reaches a photosensitive drum 4 through a zoom lens unit 21. An image of the original 1 obtained by scanning the original at the same speed from an end portion a thereof to an end portion b is formed on the photosensitive drum 4 charged by a charger 50 beforehand as a latent image. The latent image on the photosensitive drum 4 is developed by a developer 51. The developed image is transferred onto a sheet of transfer paper by a transfer charger 52. The motion of the optical system and the electrophotographic process are known, description thereof being omitted.

Figure 2:
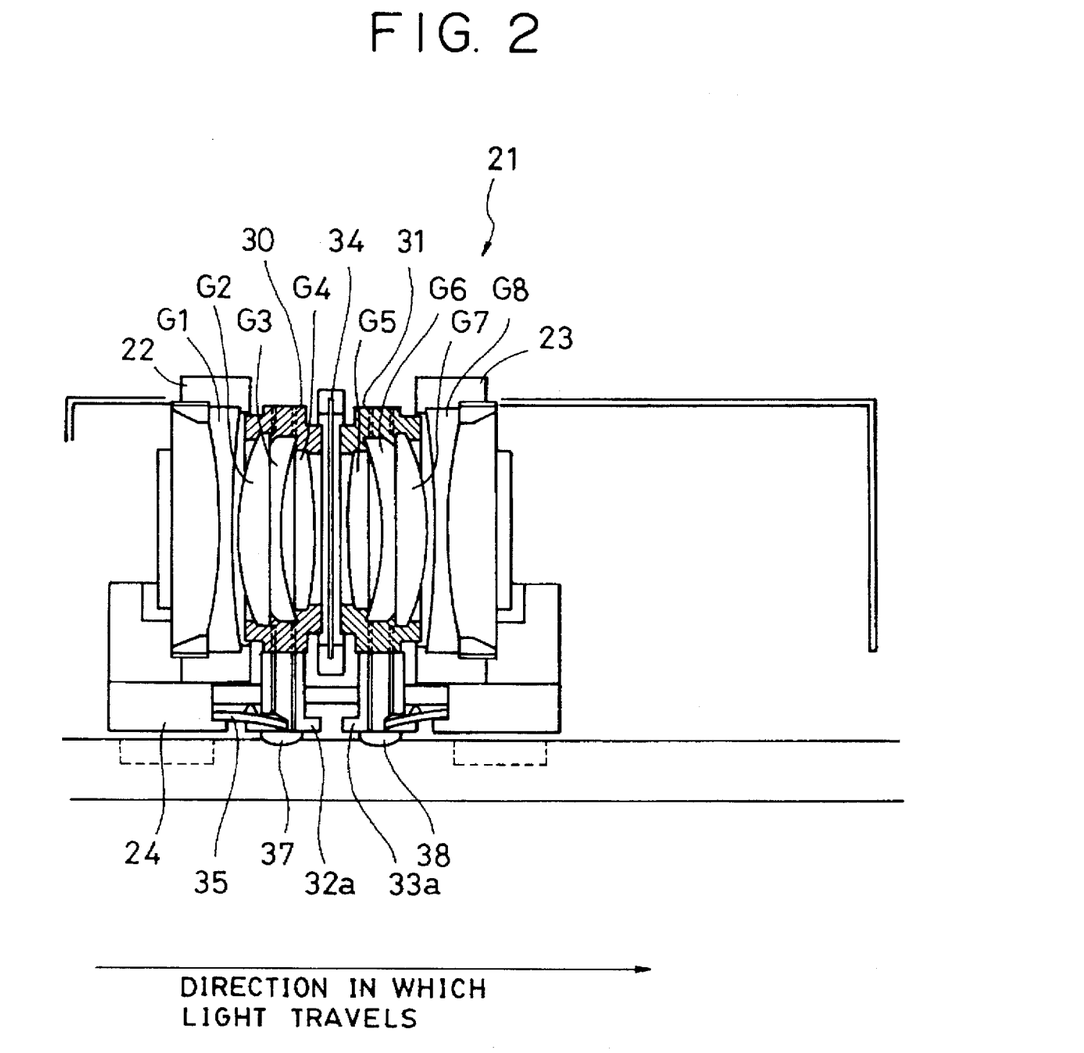
FIG. 2 is a cross-sectional view of a zoom lens in a first embodiment of the present invention.

FIG. 2 is a cross-sectional view of a zoom lens 21 which is a lens group in the zoom lens device A. FIG. 3 is a perspective view of the zoom lens unit 21. In FIGS. 2 and 3, reference numeral 24 denotes a zoom lens device body frame which can be moved by a driving source (not shown) in a direction of the optical axis along a guide 8'. Reference numerals 22 and 23 denote fixed lens barrels (support members) each supporting a stationary lens. The lens barrel 22 (the second fixed lens barrel) contains a second stationary lens G1, and the lens barrel 23 (the first fixed lens barrel) incorporates a first stationary lens G8. The second fixed lens barrel 22 is formed integrally with the zoom lens device frame 24 and serves as a reference for other lens barrels.

The first fixed lens barrel 23 is screwed to the body frame 24. The second fixed lens barrel 22 supports one end of each of two rods (shafts or guide members) 27 and 28 for guiding a movable lens in a direction of the optical axis. In this embodiment, there are two rods. However, the number of rods may be three or four. In that case, one of the three or four rods is used as a reference shaft to facilitate positioning. The other ends of the rods 27 and 28 are supported by the frame 24. Reference numerals 30 and 31 denote movable lens barrels which respectively support a movable lens group G2 through G4 and a movable lens group G5 through G7. The movable lens barrels 30 and 31 each have a hole (not shown) into which the rod 27 is fitted and a hole (not shown) into which the rod 28 is fitted. The movable lens barrels 30 and 31 are positioned relative to the rod 27.

A stop plate 34 is disposed between the movable lens barrels 30 and 31 to limit the thickness of the light rays. Reference numeral 26 denotes a cam plate serving as a lens moving means. The cam plate 26, which is movably supported by the body frame 24, is coupled to a cam groove plate 8 (FIG. 4) at a protruding portion 26d provided at one end thereof. The cam plate 26 is pressed against abutting portions of the body frame 24 by two plate springs 29 and thereby positioned without backlash.

Figure 4:
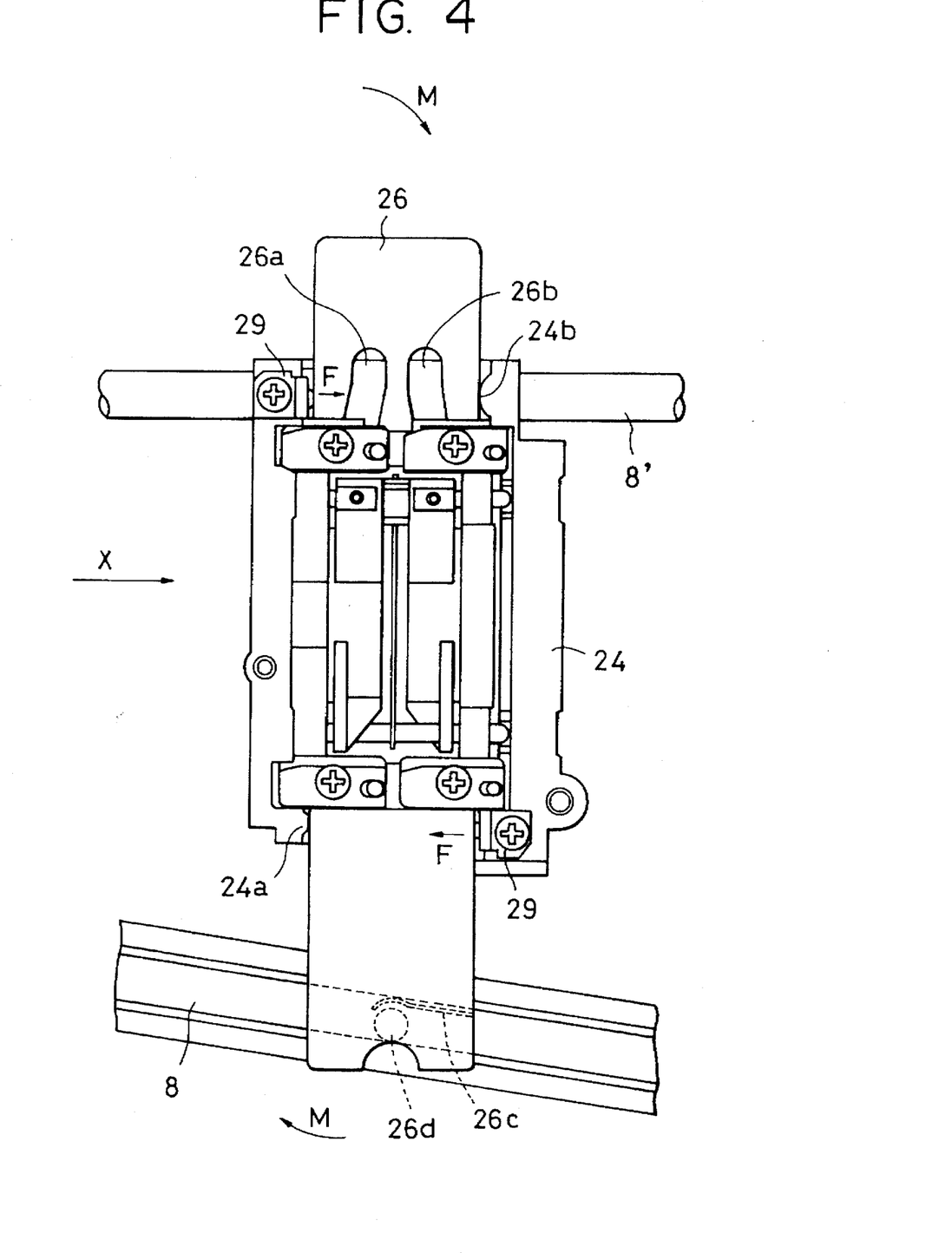
FIG. 4 is a plan view of the zoom lens of FIG. 2.

The backlash between the protruding portion 26d and the cam groove plate 8 is removed by a spring 26c (FIG. 4). The cam plate 26 is pressed against the body frame 24 in a direction F which is the same as the direction of a moment M generated as a consequence of the slide of the cam plate 26 against the cam groove plate 8, relative to a direction X in which the zoom lens device body 21 is moved.

Figure 5:
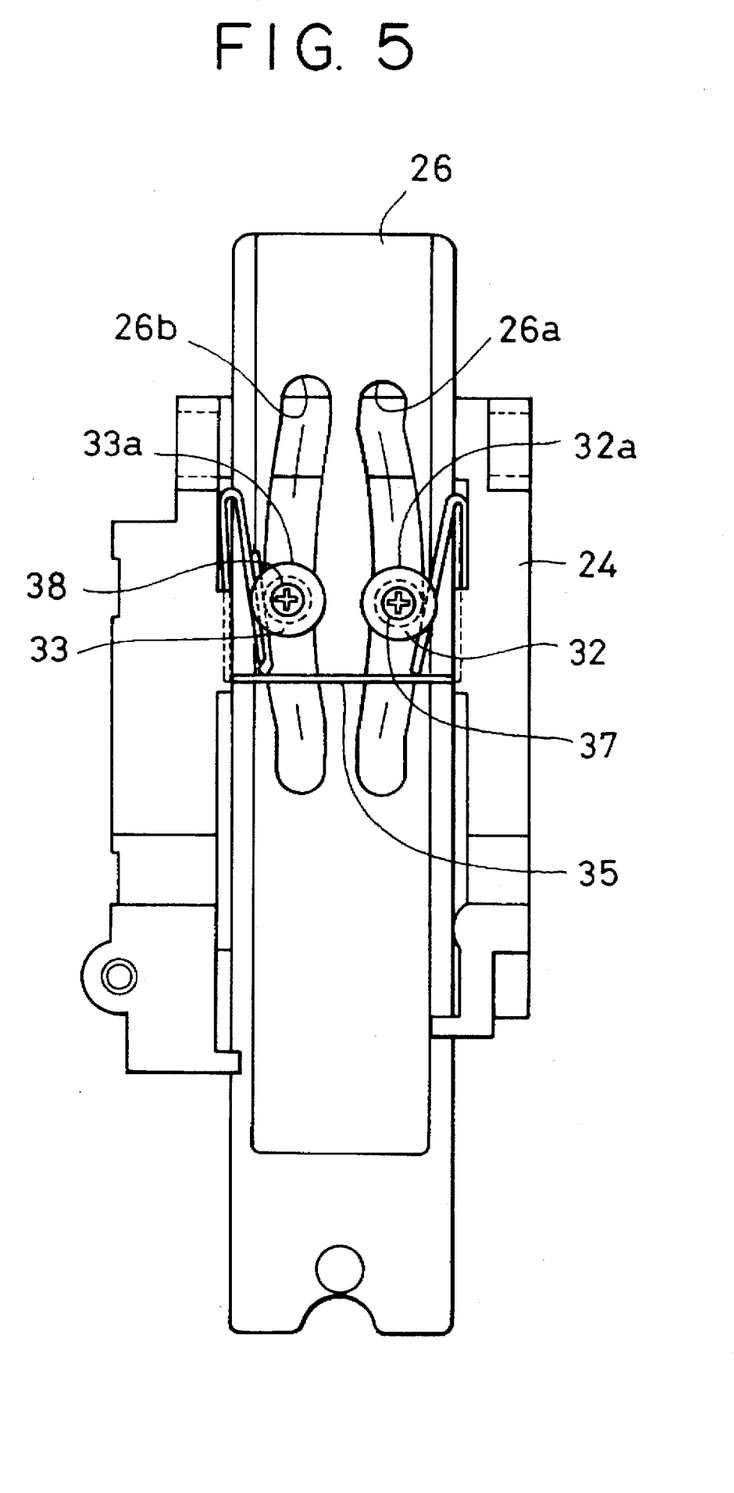
FIG. 5 is a rear view of the zoom lens of FIG. 2.

The cam plate 26 has two cam grooves 26a and 26b. Pins 32 and 33 (FIG. 5), which protrude from the movable lens barrels 30 and 31, respectively, and are attached thereto by screws 37 and 38, respectively, are fitted into the cam grooves 26a and 26b, respectively. The pins 32 and 33 have flange portions 32a and 33a, respectively, and are pushed by a spring 35 in such a manner that they can move along the inner sides of the cam grooves 26a and 26b, respectively (FIG. 5). In this embodiment, the spring 35 is made of a metal. However, a spring made of an elastic body, such as a resin or rubber, may also be used so long as it can prevent backlash between the lens barrels 30 and 31 and the lens moving means 26. Alternatively, a coil spring or a plate spring may be used.

The first stationary lens G8 is located downstream of the movable lens relative to the direction of travel of light (image light), and the second stationary lens G1 is located upstream of the movable lens in the direction of travel of the light (see FIG. 2).

Figure 6:
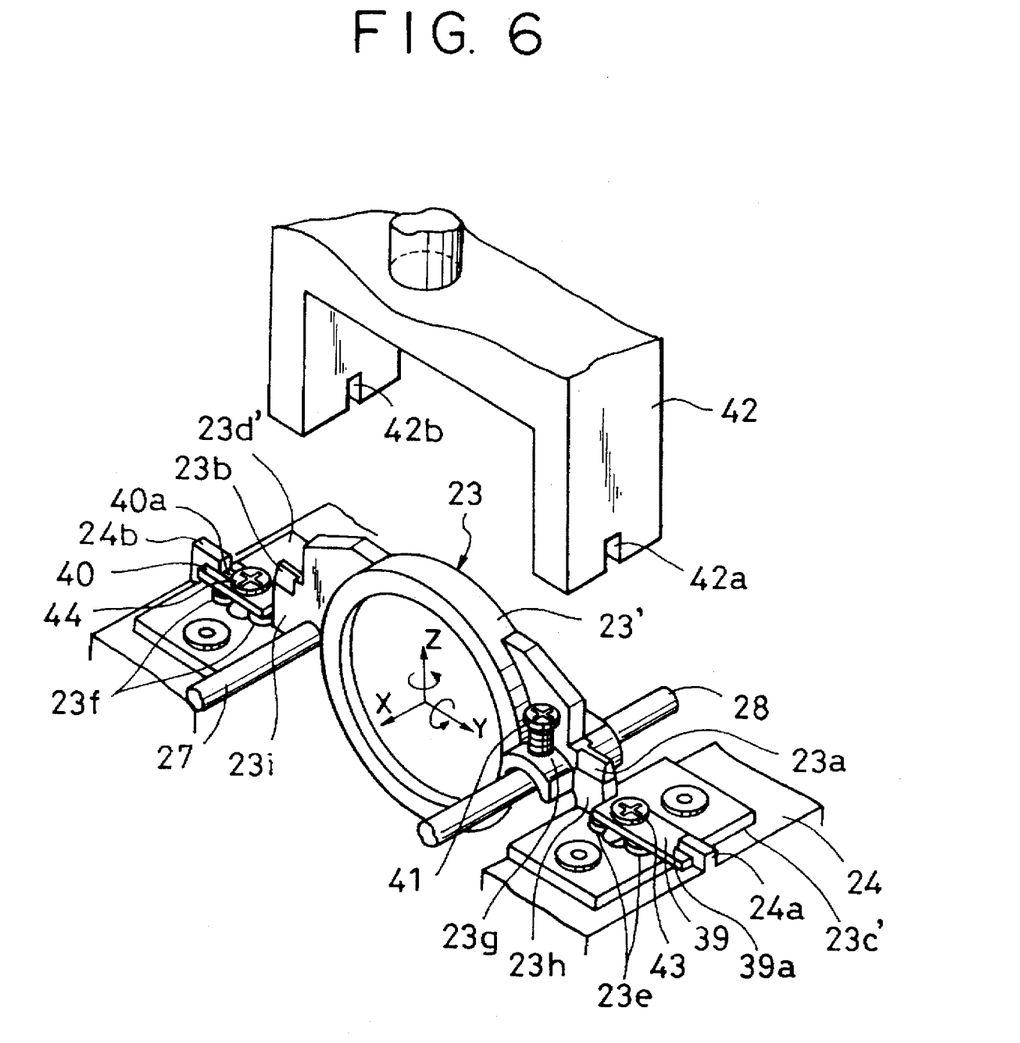
FIG. 6 is a perspective view of a fixed lens barrel 23 of the zoom lens in the first embodiment of the present invention.

The mounting portion of the body frame 24 on which the fixed lens barrel 23 (the first support member) is mounted will now be described with reference to FIGS. 6 and 7.

In these figures, the fixed lens barrel 23 has trapezoidal ribs 23a and 23b which are in engagement with grooves 42a and 42b of an adjustment jig 42, respectively. The ribs 23a and 23b are located near the rods 27 and 28 in alignment with screws 43 and 44 relative to the direction of the optical axis. Flange portions 23c' and 23d' of the fixed lens barrel 23 have protruding portions 23c and 23d which oppose protruding portions 24c and 24d of the body frame 24, respectively, and receiving surfaces 23e and 23f for receiving washers 39 and 40 used to fix the fixed lens barrel 23 to the body frame. Further, a tap 23g for receiving a screw 41 serving as adjustment means for adjusting rotation of the lens barrel about a Y axis shown in FIG. 6 is formed in the fixed lens barrel 23. The body frame 24 has protruding portions 24a and 24b which prevent rotation of the washers 39 and 40 to restrict rotation of the fixed lens barrel 23 about a Z axis shown in FIG. 6 which would occur when the fixed lens barrel 23 is screwed to the body frame. A lens supporting portion 23', which is part of the fixed lens barrel 23, is coupled to the flange portions 23c' and 23d' through coupling portions 23h and 23i, respectively, which each have a thickness smaller than that of the lens supporting portion 23' in order to prevent transmission of deformation of the flange portions 23c' and 23d', which would occur due to screwing thereof, to the lens supporting portion 23'.

Figure 7A:
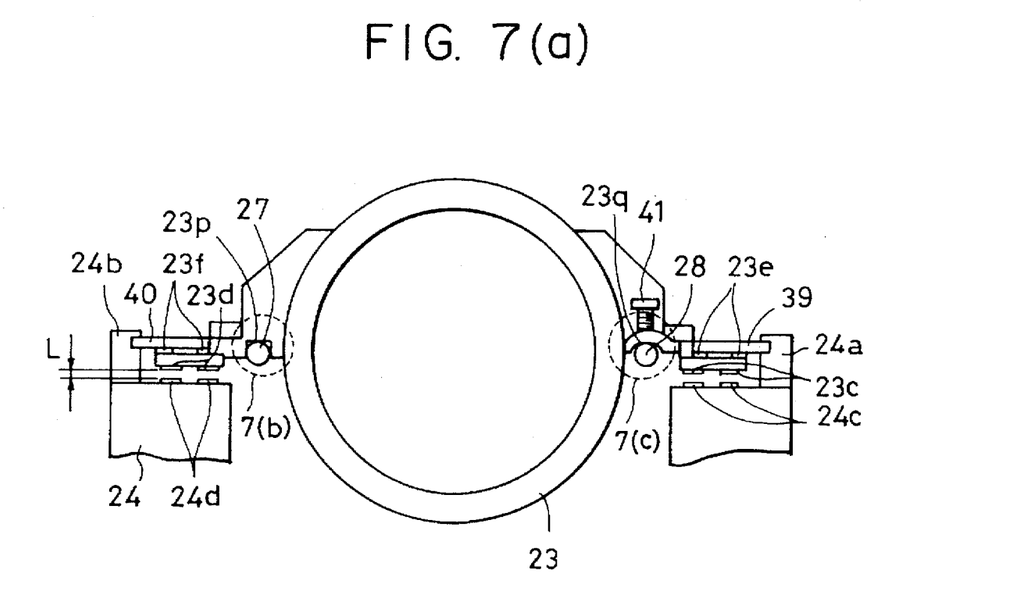
FIGS. 7(a)-7(c) are a cross-sectional views of the fixed lens barrel 23 of the zoom lens in the first embodiment of the present invention.
Figure 7B:
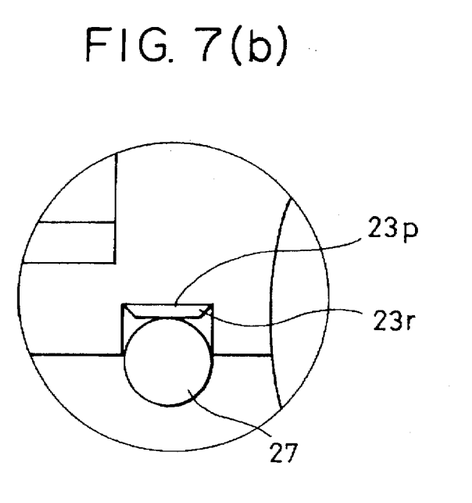
Figure 7C:
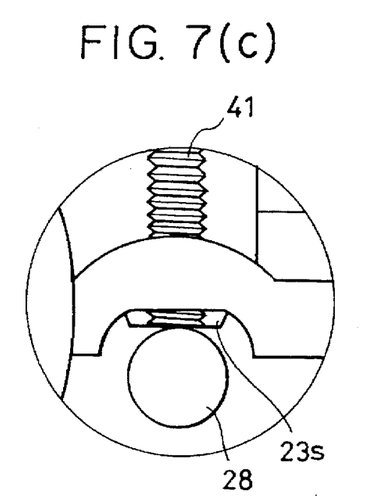

In this embodiment, small projections 23r and 23s are respectively provided on surfaces 23p and 23q (FIGS. 7(b) and 7(c)) of the lens barrel 23 with which the lens barrel 23 makes contact with the two parallel rods 27 and 28. The projections 23r and 23s are in direct contact with the rods 27 and 28, respectively. The screw 41 is screwed at a position different from the position at which the projection 23s is provided in a longitudinal direction of the rod 28 in such a manner that a distal end of the screw 41 is in contact with the rod 28. That is, the fixed lens barrel 23 is positioned relative to the rods 27 and 28 at three points, i.e., at a single point (23r) relative to the rod 27 and at the two points (23s, 41) relative to the rod 28.

A method of adjusting the fixed lens barrel 23 will now be described.

The fixed lens barrel 23 is placed on the rods 27 and 28 on which the movable lens barrels 30 and 31 are supported in such a manner as to be movable in the direction of the optical axis At that time, the lens barrel 23 is not in contact with the body frame 24 (In FIG. 7, L is between 0.04 and 0.1 mm). The washers 39 and 40 are placed on the receiving surfaces 23e and 23f of the fixed lens barrel 23 with grooves 39a and 40a of the washers 39 and 40 engaged with the protruding portions 24a and 24b of the body frame 24, and the screws 43 and 44 are temporarily tightened in taps (not shown) of the body frame 24. The screw 41 is temporarily tightened in the fixed lens barrel 23 to obtain a state shown in FIG. 6.

Thereafter, the adjusting jig 42 is lowered and the ribs 23a and 23b of the fixed lens barrel 23 are brought into engagement with the grooves 42a and 42b to conduct adjustment about the Z axis.

Next, rotation about the Y axis is adjusted by rotating the screw 41. At that time, rotation of the screw 41 is continued even after the screw 41 has made contact with the rod 28 so as to make the lens barrel 23 level. In this way, adjustment of the rotation of the lens barrel about the Y axis can be facilitated. Otherwise, the lens barrel may be inclined in two directions about the Y axis. A coupling portion between the portion in which the tap 23g for the screw 41 is formed and the lens supporting portion 23' is formed thick in the X direction so as to enable the urging force of the screw 41 to be transmitted to the lens supporting portion 23' Regarding the urging force applied by the screw 41 to the rod 28, there is no problem because the rod 28 is manufactured by a material having a large rigidity, like the rod 27.

After rotation of the lens barrel about the X axis is adjusted, the screws 43 and 44 are threaded into the zoom lens device body frame 24.

In this embodiment, the single screw 41 is provided as the adjustment means. However, two or more screws may also be provided in such a manner that they oppose each other on the two sides of the fixed lens barrel 23. The provision of the single screw 41 is more preferable than the provision of at least two screws in terms of the number of parts and the number of assembling processes.

Since the screws 43 and 44 are completely threaded into the body frame 24, the fixed lens barrel 23 can be mounted on the rods 27 and 28 in such a manner that it pushes the rods 27 and 28. At that time, since the rod 27 is loosely fitted in the hole in the fixed lens barrel 23, the amount of movement of the rod 27 is small although the rod 27 is pushed by the screw. The rod 28 is pushed by the screw, and this enables the fixed lens barrel to be positioned accurately and fixed without backlash.

Figure 3:
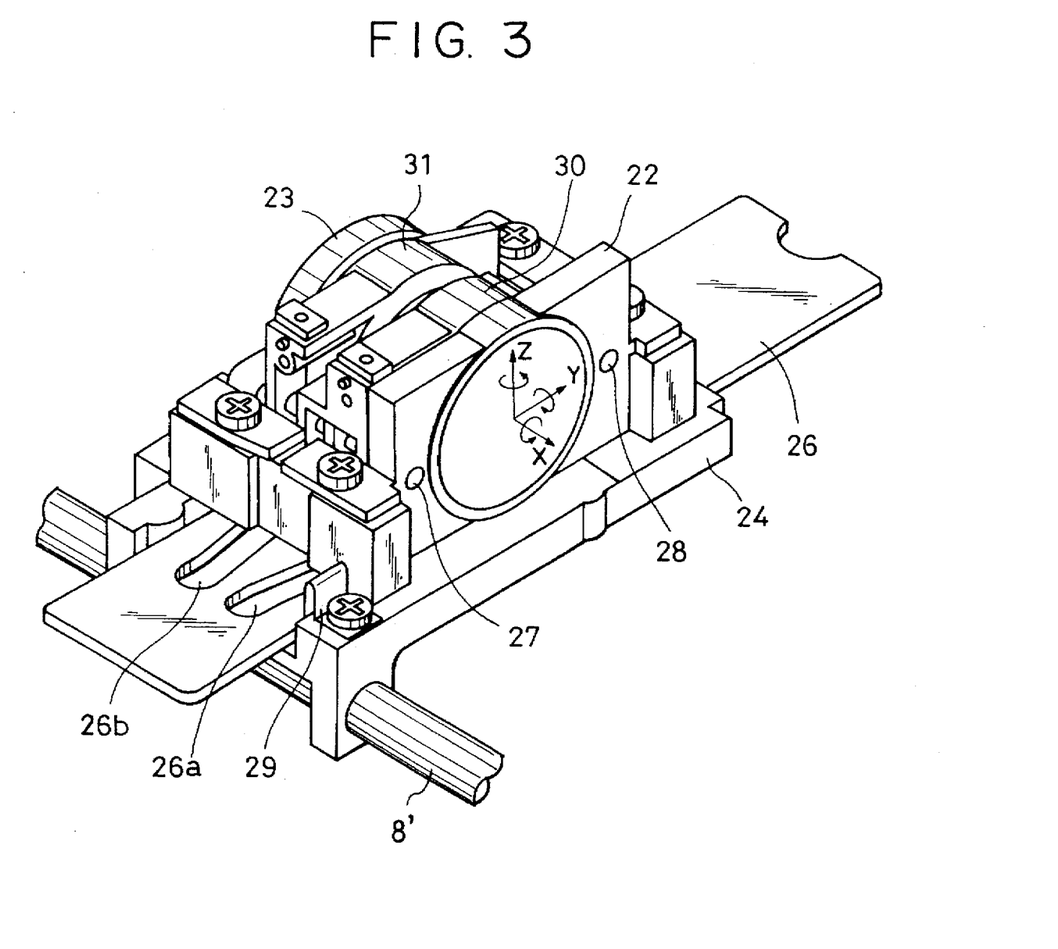
FIG. 3 is a perspective view of the zoom lens of FIG. 2.

In this embodiment, since rotation of the fixed lens barrel 23 about the X, Y and Z axes shown in FIG. 3 can be adjusted, the degree of freedom of the fixed lens barrel 23 can be increased. Thus, mounting errors between the fixed lens barrel 23 and other lens barrels on which no adjustment is conducted can be corrected, and the image forming ability of the lens barrels can be improved.

Further, since the fixed lens barrel 23 and the movable lens barrels 30 and 31 are positioned on the single member (the rod 27), a reduction in the allowances, required in a conventional device due to positioning of the lens barrels on different members, can be lessened. It is thus possible to provide a small zoom lens device which would not be able to be manufactured or would be difficult to manufacture conventionally due to too small allowances.

(Second Embodiment)

Figure 8:
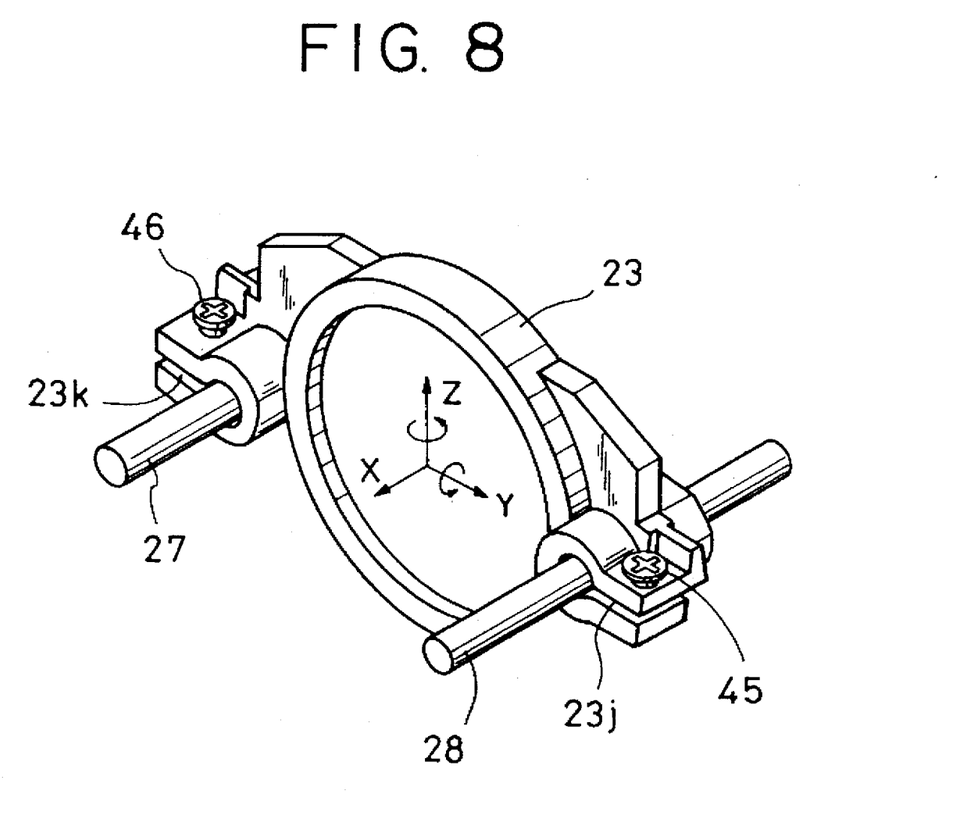
FIG. 8 is a perspective view of a fixed lens barrel 23 of the zoom lens in a second embodiment of the present invention.

FIG. 8 illustrates a second embodiment of the present invention. In this embodiment, the fixed lens barrel 23, which requires adjustment of its position, has no flange portions with which it is mounted on the body frame 24 but has notches 23j and 23k with which it is supported by the rods 27 and 28 alone. The fixed lens barrel 23 is fixed by screws 45 and 46 serving as adjustment means.

Since the fixed lens barrel 23 is supported only by the rods 27 and 28, it is not necessary to provide the flange portions with which the fixed lens barrel 23 is screwed to the body frame 24, and a smaller zoom lens device can thus be provided.

In this embodiment, the ribs 23a and 23b of the fixed lens barrel 23 which engage with the grooves 42a and 42b of the adjustment jig 42 are trapezoidal. However, ribs of any shape can be employed as long as that shape enables the adjustment jig 42 to be engaged with the fixed lens barrel 23 without backlash.

Application of the zoom lens device according to the present invention is not limited to a copying machine which employs electrophotographic technique but it can also be applied to, for example, the following display apparatus.

Figure 9:
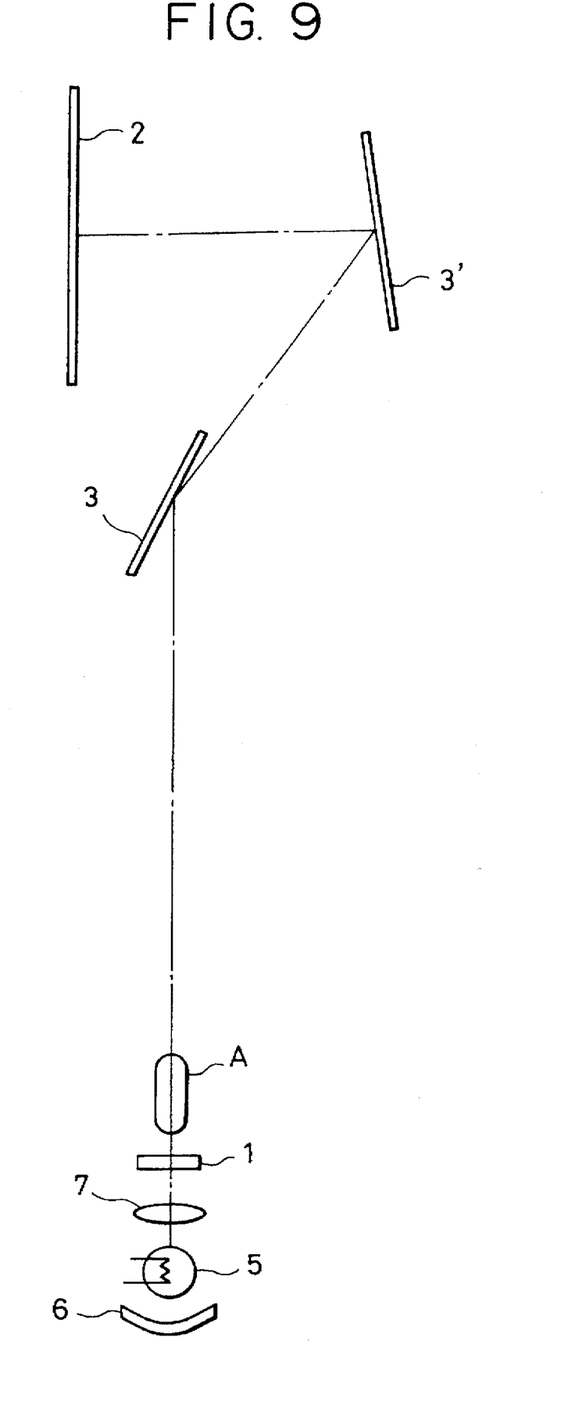
FIG. 9 is a schematic view of a display apparatus to which the present invention can be applied.

Referring to FIG. 9, reference numeral 1 denotes a microfilm. Reference numeral 2 denotes a screen serving as the display means. Reference numerals 3 and 3' denote mirrors. Reference numeral 5 denotes a light source. Reference numeral 6 denotes a condenser lens. Reference numeral 7 denotes a reflecting mirror. Reference symbol A denotes a zoom lens device.

The zoom lens device A has the same structure as that of the zoom lens device A in the first embodiment, and can be applied to the above-described apparatus for displaying an image on the screen 2.

As will be understood from the foregoing description, in the present invention, since the support member for supporting the stationary lens is positioned relative to the guide member, a zoom lens device exhibiting excellent image forming ability can be provided.

The individual components shown in outline or designated by blocks in the drawings are all well-known in the zoom lens device art and their specific construction and operation are not critical to the operation or best mode for carrying out the invention.

While the preferred forms of the present invention have been described, it is to be understood that modifications will be apparent to those skilled in the art without departing from the spirit of the invention.

What is claimed is:

1. A zoom lens device comprising:
   a movable lens which is movable in a direction along an optical axis of said zoom lens device;
   a guide device for guiding said movable lens along the direction of the optical axis;
   a stationary lens; and
   a support member for supporting said stationary lens, said support member being adjustable relative to said guide device both along the direction of the optical axis and about an axis that is perpendicular to the optical axis.

2. The zoom lens device according to claim 1, wherein said guide device comprises first and second parallel rods, and wherein said support member is adjustable relative to said first rod at a single point and relative to said second rod at two points.

3. The zoom lens device according to claim 2, further comprising adjustment means for adjusting an inclination of said stationary lens, said adjustment means being disposed at one of the two positioning points of said support member relative to said second rod.

4. The zoom lens device according to claim 1, wherein said stationary lens is located downstream of said movable lens in a direction in which light travels.

5. The zoom lens device according to claim 1, further comprising another stationary lens and another support member for supporting said another stationary lens.

6. The zoom lens device according to claim 5, wherein said zoom lens device further comprises a frame, and wherein said another support member is formed integrally with said frame.

7. The zoom lens device according to claim 5, wherein said another stationary lens is located upstream of said movable lens in a direction in which light travels.

8. A zoom lens device comprising:
   a movable lens holder that is movable along a direction of an optical axis of said zoom lens device;
   a guide device for guiding said movable lens holder; and
   a stationary lens holder coupled to and adjustable relative to said guide device both along the direction of the optical axis and about an axis that is perpendicular to the optical axis.

9. The zoom lens device according to claim 8, wherein said guide device comprises first and second rods, and wherein said stationary lens holder is adjustable relative to said first rod at a single point and relative to said second rod at two points.

10. The zoom lens device according to claim 9, further comprising adjustment means for adjusting an inclination of said stationary lens holder, said adjustment means being disposed at one of the two positioning points of said stationary lens holder relative to said second rod.

11. The zoom lens device according to claim 8, further comprising another stationary lens holder.

12. The zoom lens device according to claim 11, wherein said zoom lens device further comprises a frame, and wherein said another stationary lens holder is formed integrally with said frame.

* * * * *

UNITED STATES PATENT AND TRADEMARK OFFICE
CERTIFICATE OF CORRECTION

PATENT NO. : 5,717,530

DATED : February 10, 1998

INVENTOR(S) : KENICHI KAWAMOTO, ET AL.

It is certified that error appears in the above-identified patent and that said Letters Patent is hereby corrected as shown below:

On the title page:

AT [56] REFERENCES CITED

FOREIGN PATENT DOCUMENTS

"4350608   5/1991   Japan" should read
--4-350608   12/1992   Japan--.

Signed and Sealed this

Eighteenth Day of August, 1998

Attest:

BRUCE LEHMAN

Attesting Officer

Commissioner of Patents and Trademarks